(12) United States Patent
Okada

(10) Patent No.: US 6,413,181 B2
(45) Date of Patent: Jul. 2, 2002

(54) DIFFERENTIAL GEAR

(75) Inventor: Hideaki Okada, Amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 09/771,713

(22) Filed: Jan. 30, 2001

(30) Foreign Application Priority Data

Feb. 1, 2000 (JP) ........................................ 2000-023846

(51) Int. Cl.[7] ........................ F16H 47/04; F16H 48/20; F16H 48/06; F16H 1/44; B60K 17/20
(52) U.S. Cl. ........................ 475/83; 475/231; 475/230; 188/31
(58) Field of Search ................................ 475/231, 234, 475/83, 150, 230; 188/31, 69, 60; 74/665 M, 640; 60/444, 433, 490, 487, 485; 180/249, 250, 233, 248

(56) References Cited

U.S. PATENT DOCUMENTS

| | | | |
|---|---|---|---|
| 5,897,452 A | 4/1999 | Schreier et al. | ............. 475/230 |
| 6,007,449 A | * 12/1999 | Okada et al. | ................ 475/231 |

* cited by examiner

*Primary Examiner*—Douglas C. Butler
(74) *Attorney, Agent, or Firm*—Sterne, Kessler, Goldstein & Fox P.L.L.C.

(57) ABSTRACT

A differential gear provided for differentially connecting a pair of axles. A pair of side bevel gears are fixed onto the respective axles. A bevel pinion engages with both the side bevel gears. A pinion shaft rotatably supports the bevel pinion therearound while the pinion shaft is applying a certain brake force onto the bevel pinion. An input gear is provided with a through hole, in which the pinion shaft is disposed. A lock member is provided for selectively bringing one of the side bevel gears into non-relatively rotatable connection with the input gear.

5 Claims, 7 Drawing Sheets

DIFFERENTIAL GEAR

BACKGROUND OF THE INVENTION

1. Field of the Invention

The present invention relates to a differential gear which is applicable to a transaxle apparatus equipped on a vehicle such as a riding lawn tractor.

2. Related Art

Conventionally, there is a well-known differential gear for differentially connecting left and right axles with each other, comprising a pair of side bevel gears fixed on the respective axles, at least one bevel pinion engaging with both side bevel gears, and a differential gear casing which rotatably supports the bevel pinion.

The differential gear designed as mentioned above is provided on a vehicle so that its differential gear casing is rotated by driving power of an engine for driving the axles. The differential gear, during the turning of the vehicle, automatically adjusts the difference of rotary speed between an inside drive wheel and an outside drive wheel, thereby ensuring a smooth turning of the vehicle and preventing the drive wheels from abrasion.

However, this type of differential gear has the problem that when one of the drive wheels runs idle over a muddy or snow-covered place, the driving power is not transmitted to the other drive wheel.

In consideration of the problem, it is proposed and well-known as disclosed in U.S. Pat. No. 5,897,452, for example, that the conventional differential gear is further provided therein with a kind of brake which applies a braking force onto one of the drive wheels being about to run idle so as to give driving power to the other drive wheel. This is what is called a limited-slip differential.

For traveling on a bad road which is muddy, snow-covered or such, it is also well-known that the conventional differential gear is further alternatively with a differential locking system for locking both the axles together. This differential gear system is applicable to an agricultural vehicle which is desired to travel properly straight on a field.

However, lightening, cost-saving and compacting of the conventional differential gear system, including the limited-slip differential or the differential locking system, is disturbed by the structure thereof such that the bevel pinion is supported by the differential gear casing through pinion shafts.

SUMMARY OF THE INVENTION

An object of the present invention is to provide a limited-slip differential gear with a differential locking mechanism, preferably being minimized and reducing cost.

To achieve the object, according to the present invention, a pair of side bevel gears are fixed onto respective axles. A bevel pinion engages with both the side bevel gears. Preferably an input gear is provided with a through hole in which the bevel pinion is disposed so that a differential gear casing becomes unnecessary, thereby enabling a light, compact and cost-saving differential gear to be provided.

A lock member selectively bringing one of the side bevel gears into non-relatively rotatable connection with the input gear is provided for convenience in steadily travelling on unstable ground such as mud, snowcovered or the like. A certain friction force is applied onto the side bevel gears through the bevel pinion, thereby constituting a limitedslip differential gear. The resulting limited-slip differential gear provided with a locking system is light, compact and cost-saving.

Preferably, a pinion shaft is provided for rotatably supporting the bevel pinion therearound while the pinion shaft applies a certain brake force onto the bevel pinion. In this case, the pinion shaft is disposed in the through hole of the input gear.

The present limited-slip differential gear provided with a locking system may be disposed in a transaxle apparatus. Preferably, the transaxle apparatus is constructed so that the present differential gear and a hydrostatic transmission are disposed in a common housing, wherein the input gear of the differential gear receives the output of the hydrostatic transmission. Consequently, the transaxle apparatus is light, compact and cost-saving.

Other and further objects, features and advantages of the invention will appear more fully from the following description.

DETAILED DESCRIPTION OF THE PREFERRED EMBODIMENTS

Figure 1:
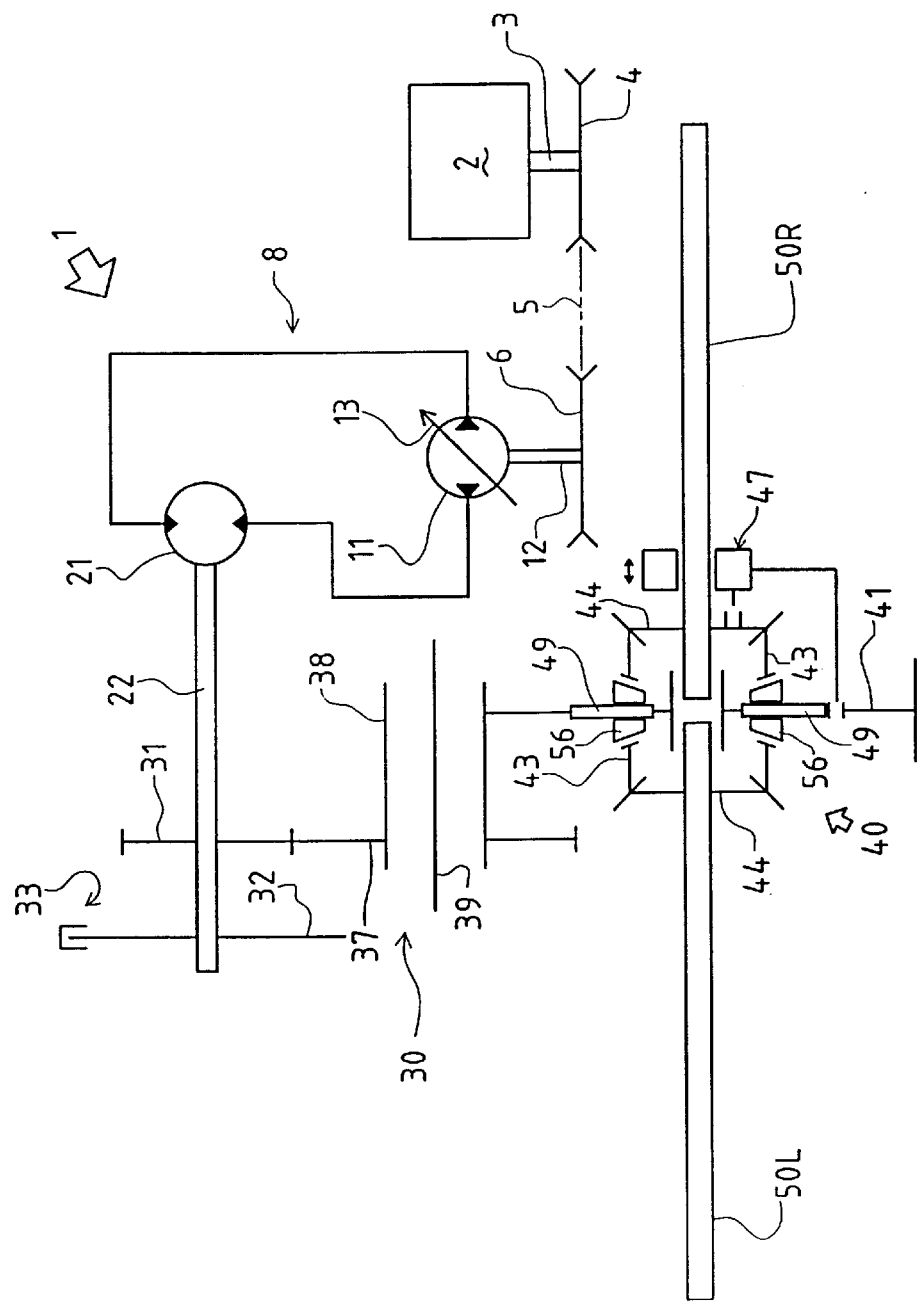
FIG. 1 is a schematic diagram of a power transmission system of a transaxle apparatus including a differential gear of the Present invention.
Figure 2:
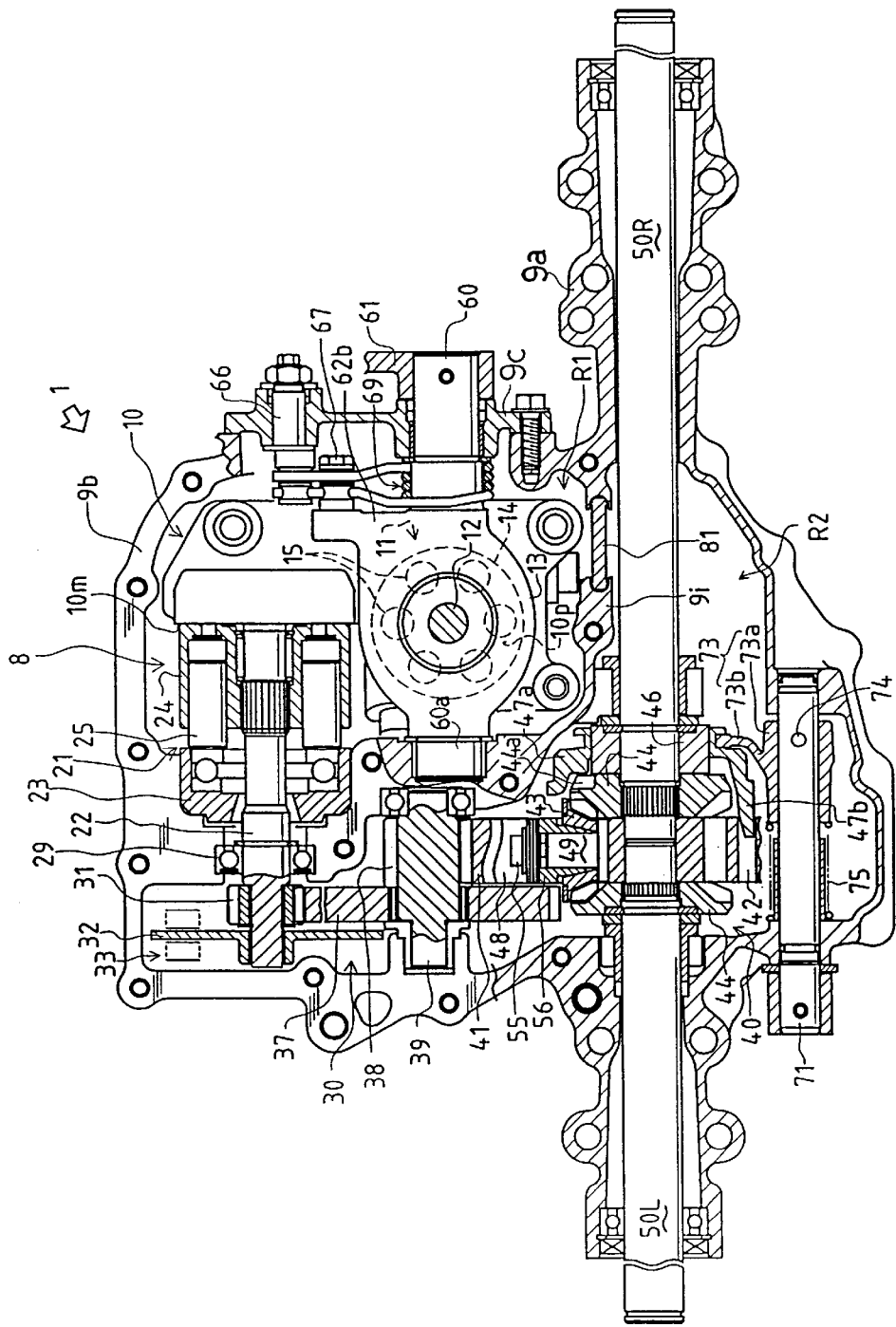
FIG. 2 is a plan view, partly in section, of the transaxle apparatus showing the differential gear of the present invention.

Referring to FIG. 2, a transaxle apparatus 1, whose power transmission system is shown in FIG. 1, comprises a housing 9 constituted by an upper housing part 9a and a lower housing part 9b which are joined with each other through their surrounding horizontal flat joint surfaces. A bearing portion for a motor shaft 22 is formed by upper and lower housing parts 9a and 9b on their joint surfaces. Axles 50L and 50R are rotatably supported through a bearing portion formed by upper housing part 9a above its joint surface. In housing 9 is disposed a differential 40 through which axles 50L and 50R are differentially connected at their inside ends with each other. Axles 50L and 50R project laterally outwardly from left and right outer ends of housing 9, respectively.

Referring to FIG. 2, the inner space of housing 9 is divided into a first chamber RI and a second chamber R2 through a partition wall 9i formed integrally with housing 9. Moreover, partition wall 9i is integrally formed of upper housing part 9a and lower housing part 9b joined with each other. In first chamber RI is disposed a hydrostatic transmission (hereinafter, "an HST") 8. In second chamber R2 is disposed differential 40, a gear train 30 which is interposed between motor shaft 22 of HST 8 and differential 40, and axles 50L and 50R.

Partition wall 9i, as shown in FIG. 2, extends laterally along axle 50R and is bent so as to extend longitudinally in perpendicular to axle 50R, thereby making first chamber R1 substantially rectangular and forming second chamber R2 in a substantially L-like shape disposed along two adjacent edges of first chamber R1. Therefore, HST 8 and axle 50R are juxtaposed forwardly and rearwardly through a lateral extending portion of partition wall 9*i*, and HST 8 and gear train 30 are juxtaposed rightwardly and leftwardly through a longitudinal extending portion of partition wall 9*i*. Differential 40 is disposed in the corner portion of L-like shaped second chamber R2 serving as a cross point of axles 50L and 50R and gear train 30.

First chamber R1 and second chamber R2 are filled with oil in common, thereby serving as oil sumps. As shown in FIG. 2, partition wall 9*i* is bored at its optional portion by a hole in which an oil filter 81 is disposed. In this embodiment, oil filter 81 is provided in the lateral extending portion of partition wall 9*i* between HST 8 and axle 50R. Oil filter 81 allows the oil to flow therethrough between first and second chambers R1 and R2. First chamber R1 is supplied therein with oil cleaned through oil filter 81 from second chamber R2, while the oil undergoing obstacles such as iron powder generated from rubbing gears in second chamber R2. Thus, the oil used as lubricating oil for gears and bearings of gear train 30, differential 40 and the like can be also used as fine operating oil for HST 8.

Housing 9 is provided at the ceiling of its upper housing part 9*a* with an oil replenishing port (not shown) in communication with first chamber RI. An external oil reservoir (not shown) disposed outside housing 9 is connected with the oil replenishing port directly or through a piping (not shown) like a rubber hose. While the oil used as operating oil for HST 8 is heated by the action of HST 8 so as to expand the whole of oil in first chamber R1 (and second chamber R2), the excessively increased oil flows into the oil reservoir, thereby adjusting the volume of oil in housing 9.

The structure of HST 8 will be described. As shown in FIG. 2, a center section 10 is removably attached to housing 9 in first chamber R1. Center section 10 is provided at its forward half portion with a vertical surface disposed perpendicularly to axles 50L and 50R. The vertical surface serves as a motor mounting surface 10*m* to which a hydraulic motor 21 is mounted. Center section 10 is provided at its rearward half portion with a horizontal surface serving as a pump mounting surface 10*p* to which a hydraulic pump 11 is mounted.

Referring to the structure of hydraulic pump 11, as shown in FIG. 2, a cylinder block 14 is slidably mounted onto pump mounting surface 10*p* so as to be rotatable centering its vertical axis relative to center section 10. A pump shaft 12 is vertically disposed through a center of pump mounting surface 10*p* and rotatably supported by center section 10. Pump shaft 12 is axially disposed through cylinder block 14. Pump shaft 12 and cylinder block 14 are locked together. Cylinder block 14 is provided therein with a plurality of cylinder holes disposed in parallel to Pump shaft 12 and on the periphery of pump shaft 12. Pistons 15 with biasing springs are reciprocally movably inserted into the cylinder holes, respectively.

Pump shaft 12 projects upwardly from the top of upper housing part 9*a* for serving as an input shaft. An input pulley 6, as shown in FIG. 1, and a cooling fan (not shown) is fixed onto the upwardly projecting portion of pump shaft 12. As shown in FIG. 1, an output pulley 4 is fixed onto an output shaft 3 of a vehicle engine 2. A belt 5 is interposed between output pulley 4 and input pulley 6 so as to transmit power from engine 2 to hydraulic pump 11.

A movable swash plate 13 is disposed in housing 9 between the ceiling of upper housing part 9*a* and cylinder block 14 so as to abut against heads of pistons 15. Swash plate 13 is tilted so as to incline its surface abutting against the heads of pistons 15 at an optional angle from the horizontal plane perpendicular to the rotary axis of cylinder block 14, thereby varying the direction and amount of oil discharged from hydraulic pump 11 to hydraulic motor 21 through a hydraulic circuit within center section 10.

Swash plate 13 made as a trunnion type is downwardly curved at both its ends on which coaxial trunnion shafts 60 and 60*a* are laterally provided respectively. Trunnion shaft 60*a* is journalled in partition wall 9*i*. Trunnion shaft 60 is journalled through a cover 9*c* attached to upper housing part 9*a* and extended outwardly for serving as a speed control shaft. A speed control arm 61 is fixed onto the outward projecting portion of trunnion shaft 60. Speed control arm 61 is linked with a speed control operating tool (not shown) such as a lever provided in the vicinity of a driver's seat of a vehicle. Therefore, speed control arm 61 together with trunnion shafts 60 and 60*a* are rotated in a longitudinal direction of the vehicle so as to rotate swash plate 13 slantwise around trunnion shafts 60 and 60*a*, thereby varying the direction and degree of output rotation of hydraulic motor 21.

Swash plate 13 is formed integrally with a neutral arm 62*b* from which a pin 67 projects toward cover 9*c*. An eccentric shaft 66 is disposed through cover 9*c* and projects inwardly and outwardly from cover 9*c*. The inward projecting portion of eccentric shaft 66 is disposed eccentrically to the axis of the portion thereof supported in cover 9*c*. In housing 9, a neutral spring 69 is coiled around trunnion shaft 60 and extended parallel at its both end portions so as to sandwich pin 67 and the inward projecting portion of eccentric shaft 66.

When speed control arm 61 is rotated from its neutral position, pin 67 is integrally rotated so as to forcedly push one of the end portions of neutral spring 69 further away from the other end portion which is held at its initial position by eccentric shaft 66. When rotated speed control arm 61 is released from the operating force which has been applied thereon, the end portion of neutral spring 69 which has been pushed by pin 67 returns to its initial position by its biasing force so as to push pin 67 to its initial position, thereby automatically returning swash plate 13 to its neutral position.

A nut 66*a* is provided on the threaded outward projecting portion of eccentric shaft 66. When eccentric shaft 66 is rotated in relative to nut 66*a*, the inward projecting portion of eccentric shaft 66 disposed between both the end portions of neutral spring 69 is revolved centering the axis of the portion of eccentric shaft 66 disposed in cover 9*c* so as to change the initial position of both the end portions of neutral spring 69 together with pin 67, thereby adjusting the neutral position of swash plate 13.

Referring to the structure of hydraulic motor 21, as shown in FIG. 2, a cylinder block 24 is slidably mounted onto motor mounting surface 10*m* so as to be rotatable relative to center section 10 centering its horizontal axis disposed in parallel to axles 50L and 50R. Motor shaft 22 is axially disposed through cylinder block 24, thereby being disposed laterally in parallel to axles 50L and 50R. Motor shaft 22 and cylinder block 24 are locked together. Cylinder block 24 is provided therein with a plurality of cylinder holes disposed in parallel to motor shaft 22 and on the periphery of motor shaft 22. Pistons 25 with biasing springs are reciprocally movably inserted into the cylinder holes, respectively.

A fixed swash plate 23 is disposed in housing 9 so as to abut against heads of pistons 25. Swash plate 23 is fixedly sandwiched between upper and lower housing parts 9*a* and 9*b*.

Motor shaft 12 is horizontally disposed between upper and lower housing parts 9a and 9b as mentioned above. Motor shaft 22 is inserted at one end thereof into center section 10 through the center of pump mounting surface IOP and rotatably supported by center section 10. Motor shaft 22 is extended through swash plate 23 from cylinder block 24 oppositely to center section 10 so as to project at the other end thereof into second chamber R2. Motor shaft 22 is journalled at its intermediate portion through a bearing 29 in partition wall 9i. Bearing 29 is sandwiched between the portions of upper and lower housing parts 9a and 9b which are formed into partition wall 9i. Bearing 29 is provided with an oil seal so as to prevent first and second chambers RI and R2 from fluidal communication with each other through bearing 29.

Gear train 30 will be described. In second chamber R2, an output gear 31 and a brake disc 32 are fixed onto motor shaft 22, and a brake device 33 is disposed in the vicinity of brake disc 32 so as to apply braking force onto brake disc 32 for braking motor shaft 22.

A counter shaft 39 is rotatably disposed parallel between motor shaft 22 and differential 40 in second chamber R2. Counter shaft 39 is formed on its periphery with a speed reduction gear 38. A speed reduction gear 37 which is diametrically larger than speed reduction gear 38 is disposed around counter shaft 39. Speed reduction gear 37 is formed at its inner periphery with teeth which engages with speed reduction gear 38, thereby being fixed to counter shaft 39. Speed reduction gear 37 engages with output gear 31. Speed reduction gear 38 engages with an input gear 41 of differential 40.

Differential 40 as a principal part of the present invention will be described in accordance with FIGS. 2 to 4.

Each of coaxial left and right axles 50L and 50R is fixedly provided on its inward end portions with a side bevel gear 44. Axles 50L and 50R are further extended toward each other from respective side bevel gears 44 thereon and rotatably inserted into a center hole 41a of input gear 41.

Figure 4:
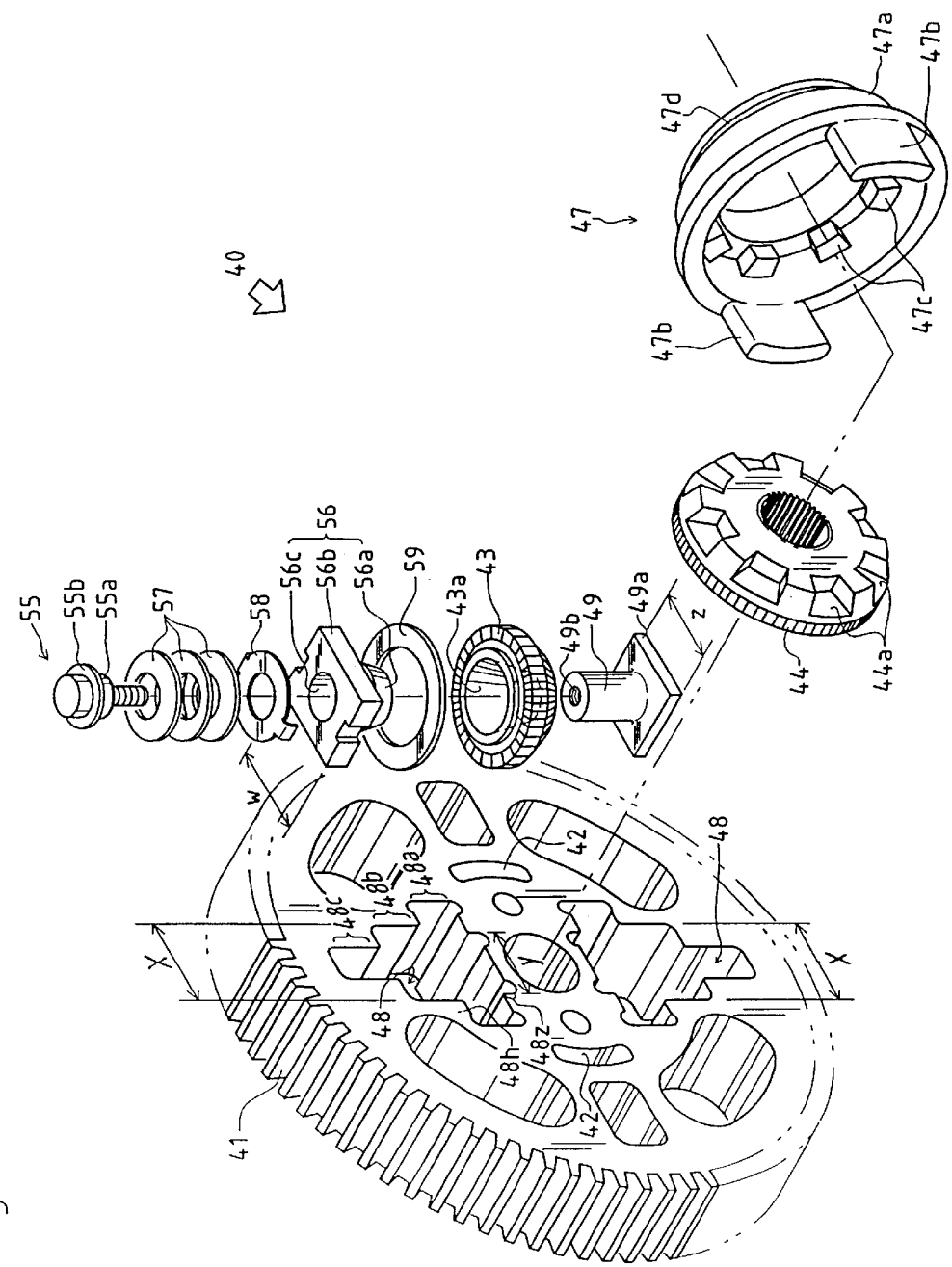
FIG. 4 is an exploded Perspective view of the same during assembly thereof.

As best shown in FIG. 4, input gear 41 is bored through between left and right side surfaces thereof with a pair of pinion holes 48 disposed symmetrically with respect to center hole 41a. As detailed later, a pinion shaft 49 and a bevel pinion 43 are disposed in each pinion hole 48. Input gear 41 is also provided with a pair of lock holes 42 which is open at one side surface of input gear 41. Lock holes 42 are disposed symmetrically with respect to center hole 41a, and each lock hole 42 is disposed between pinion holes 48.

Left and right side bevel gears 44 sandwich input gear 41 while abutting at their side surfaces against the left and right side surfaces of input gear 41 for axially locating input gear 41.

A differential-locking system locks input gear 41 with either left or right side bevel gear 44, thereby locking left and right axles 50L and 50R together. In the embodiment shown in FIGS. 2–4, right side bevel gear 44 is Provided for the differential-locking system. Right side bevel gear 44 is provided at its side surface opposite to input gear 41 with a plurality of recesses 44a. A collar 46 is provided around right axle 50R. A lock member 47 is axially slidably provided on collar 46. Lock member 47 includes a boss portion 47a disposed around collar 46, a pair of pawls 47b integrally projecting from boss portion 47a in correspondence to respective lock holes 42 of input gear 41, and a plurality of projections 47c integrally formed on the periphery of boss portion 47a in correspondence to respective recesses 44a of right side bevel gear 44.

Figure 3:
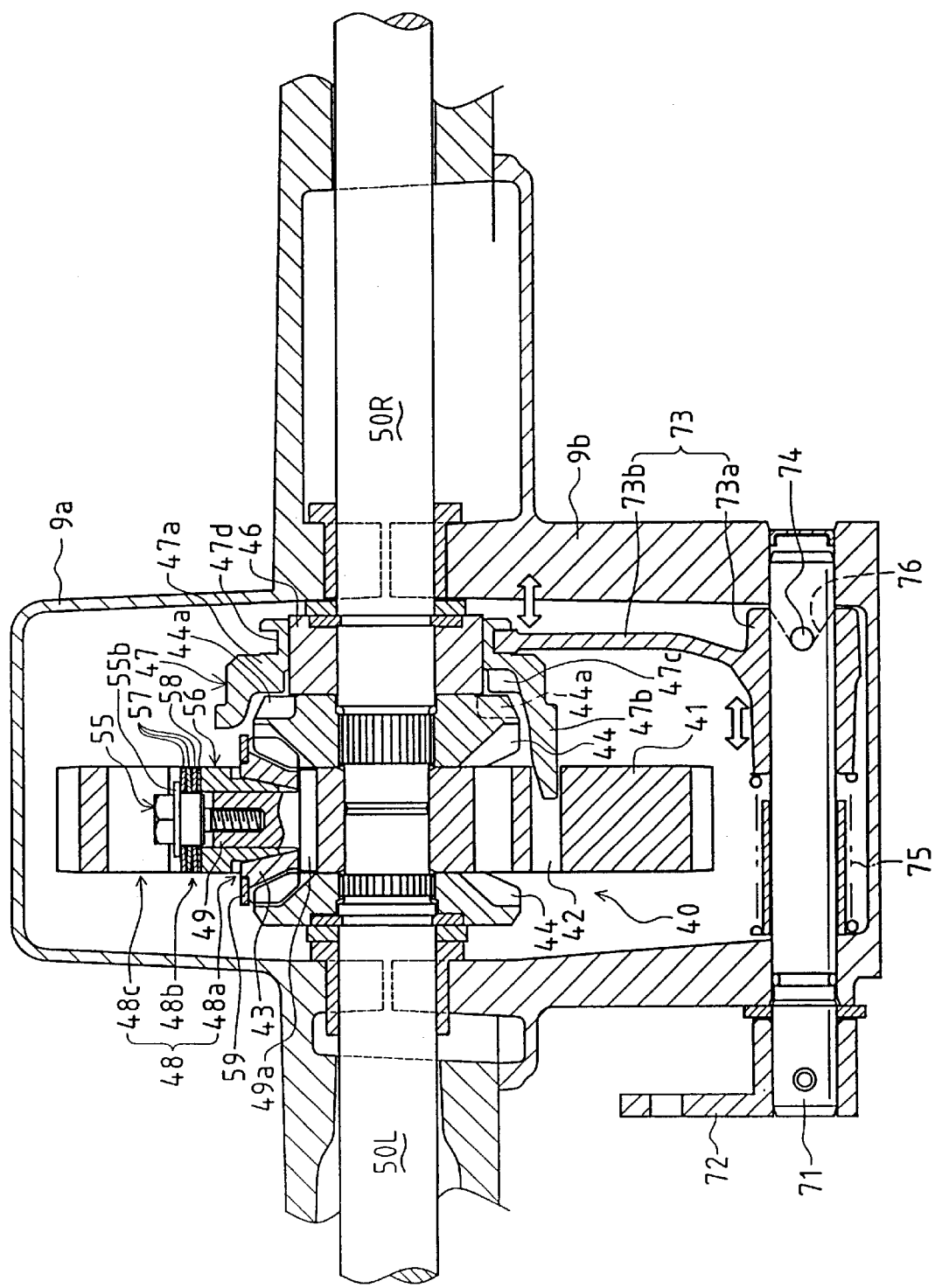
FIG. 3 is a front view, partly in section, of the differential gear of the present invention.

Referring to the structure for sliding lock member 47, as shown in FIGS. 2 and 3, a shifter shaft 71 is disposed parallel to axles 50L and 50R in housing 9 (in this embodiment, in lower housing part 9b). Shifter shaft 71 is journalled at its both ends in opposite side wall portions of lower housing parts 9b and outwardly projects at its one end from housing 9. A differential-locking arm 72 is fixed onto the outward projecting portion of shifter shaft 71. Differential-locking arm 72 interlocks with a differential-locking operating tool (not shown) such as a lever provided in the vicinity of a driver's seat of a vehicle.

A shifter 73 is disposed at its boss portion 73a around shifter shaft 71 in housing 9. A fork 73b is integrally extended from boss portion 73a. Lock member 47 is formed on its boss portion 47a with a peripheral groove 47d. Fork 73b is engaged into groove 47d, thereby holding lock member 47.

As shown in FIG. 3, a pin 74 is fixedly and radially disposed on differential-locking arm 72. One edge of boss portion 47a of lock member 47 is partly notched so as to serve as a cam notch 76 corresponding to pin 74. A tension spring 75 is provided around shifter shaft 71 and disposed between one side wall portion (in this embodiment, a left side wall portion) of lower housing part 9b and boss portion 73a of shifter 73 for biasing shifter 73 and lock member 47 away from input gear 41 so as to press boss portion 73a against pin 74.

Pin 74 is initially engaged in cam notch 76, thereby locating lock member 47 at its right limit position. In this state, pawls 47b and projections 47c of lock member 47 are disposed off from respective lock holes 42 and recesses 44a so that left and right axles 50L and 5 OR can differentially rotate.

When differential-locking arm 72 is rotated together with shifter shaft 71 so as to make pin 74 escape from cam notch 76, shifter 73 is pushed by pin 74 so as to slide leftward along shifter shaft 71, whereby locking member 47 engaging with shifter 73 approaches right side bevel gear 44 and input gear 41 so that projections 47c of locking member 47 are inserted into respective recesses 44a of right side bevel gear 44 and pawls 47b are inserted into respective lock holes 42 of input gear 41. Consequently, input gear 41 and right side bevel gear 44 are fixed to each other through locking member 47, thereby making left and right axles 50L and 50R rotatable integrally with each other.

A pair of common assemblies, each of which includes bevel pinion 43 and brake member 56 for providing limited-slip differential 40, are attached into respective pinion holes 48 of input gear 41. For convenience in drawing, FIG. 4 illustrates one of the assemblies. Detailed description will be given on the assembly arranged in each of pinion holes 48 with best reference to FIG. 4.

As mentioned above, the pair of pinion holes 48 are formed symmetrically in input gear 41. Each of pinion holes 48 is stepped with a first chamber 48a, a second chamber 48b and a third chamber 48c so as to become centrifugally narrower with respect to the axis of input gear 41. First chamber 48a, which is the nearest to the axis of input gear 41, accommodates bevel pinion 43. Third chamber 48c, which is the nearest to the outer periphery of input gear 41, accommodates a head of a later-discussed brake force adjusting bolt 55. Second chamber 48b arranged between first and second chambers 48a and 48c accommodates later-discussed leaf springs 57.

Pinion shaft 49 is integrally formed on one end thereof with a rectangular base plate 49a. In first chamber 48a of pinion hole 48 is provided a recess 48z which is recessed toward the axis of input gear 41 at a depth coinciding with the thickness of base plate 49a. A width y of recess 48z coincides with a width z of base plate 49a. In opposite to base plate 49a, pinion shaft 49 is axially provided in the other end portion thereof with a female screwed hole 49b, into which later-discussed brake force adjusting bolt 55 is screwed.

A brake member 56 for applying a brake force onto bevel pinion 43 is supported around pinion shaft 49. Brake member 56 is constituted of a rectangular thick plate 56b which is formed on one side surface thereof with a conical portion having a frictional outer-peripheral surface 56a. A slide hole 56c is axially provided through the conical portion of brake member 56. A width w of thick plate 56b of brake member 56 coincides with a width x of second chamber 48b.

Previously, pinion shaft 49 penetrates brake member 56 through slide hole 56c. Then, brake member 56 and pinion shaft 49 are arranged so as to locate thick plate 56b of brake member 56 in second chamber 48b, so that brake member 56 becomes axially slidable but non-rotatable on pinion shaft 49. Another side surface of thick plate 56b in opposite to the conical portion receives the force of later-discussed leaf springs 57.

Bevel pinion 43 is axially recessed corresponding to the conical portion of brake member 56 so as to form a conical frictional inner-peripheral surface 43a. The conical portion of brake member 56 is inserted into the conical recess of bevel pinion 43 so as to make frictional outer-peripheral surface 56a and frictional inner-peripheral surface 43a slidably abut against each other, whereby bevel pinion 43 is rotatably supported around pinion shaft 49 through brake member 56. In this state, during the rotation of bevel pinion 43 with respect to the axis of pinion shaft 49, sliding friction is generated between bevel pinion 43 and brake member 56, so that bevel pinion 43 and brake member 56 together function as a friction clutch.

Bevel pinion 43 engaging with brake member 56 in such a manner is arranged in first chamber 48a of pinion hole 48 so that it projects from both opposite side surfaces of input gear 41 so as to engage with both left and right side bevel gears 44, as shown in FIG. 3. End surfaces 48h of first chamber 48a are brought into contact with bevel pinion 43 through a washer 59 so as to receive thrust force of bevel pinion 43.

Brake force adjusting bolt 55 is screwed into female screwed hole 49b of pinion shaft 49. Brake force adjusting bolt 55 is integrally provided on its head with a shoulder 55a and a flange 55b. A washer 58 and a plurality of leaf springs 57 are provided around shoulder 55a between flange 55b and the above-mentioned surface of brake member 56. Leaf springs 57 apply their spring force onto the surface of brake member 56, so as to press frictional outer-peripheral surface 56a of brake member 56 against frictional inner-peripheral surface 43a of bevel pinion 43, thereby generating frictional braking force against rotating bevel pinion 43. The frictional braking force is transmitted to side bevel gears 44 and axles 50L and 50R through bevel pinions 43.

According to this structure, driving power of engine 2 transmitted through HST 8 is introduced into input gear 41 and transmitted to axles 50L and 50R through bevel pinions 43 and side bevel gears 44, thereby driving the left and right drive wheels of a vehicle.

If one of the pair of drive wheels is about to run idle on a road which is muddy, snow-covered or the like, the above-mentioned frictional braking force functions against the rotation of bevel pinions 43, in other words, it functions as a force for rotating both left and right axles 50L and 50R integrally with each other. Accordingly, the power of engine 2 is also transmitted to the drive wheel other than the idling drive wheel, thereby enabling the vehicle to escape from the mud, snow or the like on the road easily.

When the vehicle turns on a curve, a large differential force is generated between left and right axles 50L and 50R. The differential force functions as a force for rotating bevel pinions 43. When this force exceeds the above-mentioned frictional braking force, frictional inner-peripheral surface 44a slips against frictional outer-peripheral surface 56a so as to rotate bevel pinions 43 around respective brake members 56. Consequently, a difference of rotary speed is generated between left and right axles 50L and 50R, thereby letting the vehicle turn smoothly.

The frictional braking force can be adjusted with brake force adjusting bolt 55. As brake force adjusting bolt 55 is rotated to be tightened, leaf springs 57 are pressured so as to apply increased spring force onto brake member 56, thereby increasing the frictional braking force against bevel pinions 43, in other words, increasing the force for rotating left and right axles 50L and 50R integrally with each other, so that the vehicle can travel on a road in a bad condition more smoothly.

However, as the frictional braking force is increased, the force for rotating left and right axles 50L and 50R integrally with each other is increased so as to cause the left and right drive wheels to drag on a ground or to be twisted. In the case that the prevention of the damage of the ground surface is preferred, e.g., that a lawn tractor having the present embodiment travels on a turf, brake force adjusting bolt 55 is rotated to be loosened so that the compression force of leaf springs 57 as the force applied on brake member 56 is reduced. Therefore, the frictional braking force between frictional inner-peripheral surface 43a and frictional outer-peripheral surface 56a can be reduced. This means that the force for rotating left and right axles 50L and 50R integrally with each other can be reduced. Consequently, considering the abovementioned example, a lawn tractor which prevents a turf from being damaged by the drive wheels during its turning can be provided.

Figure 5:
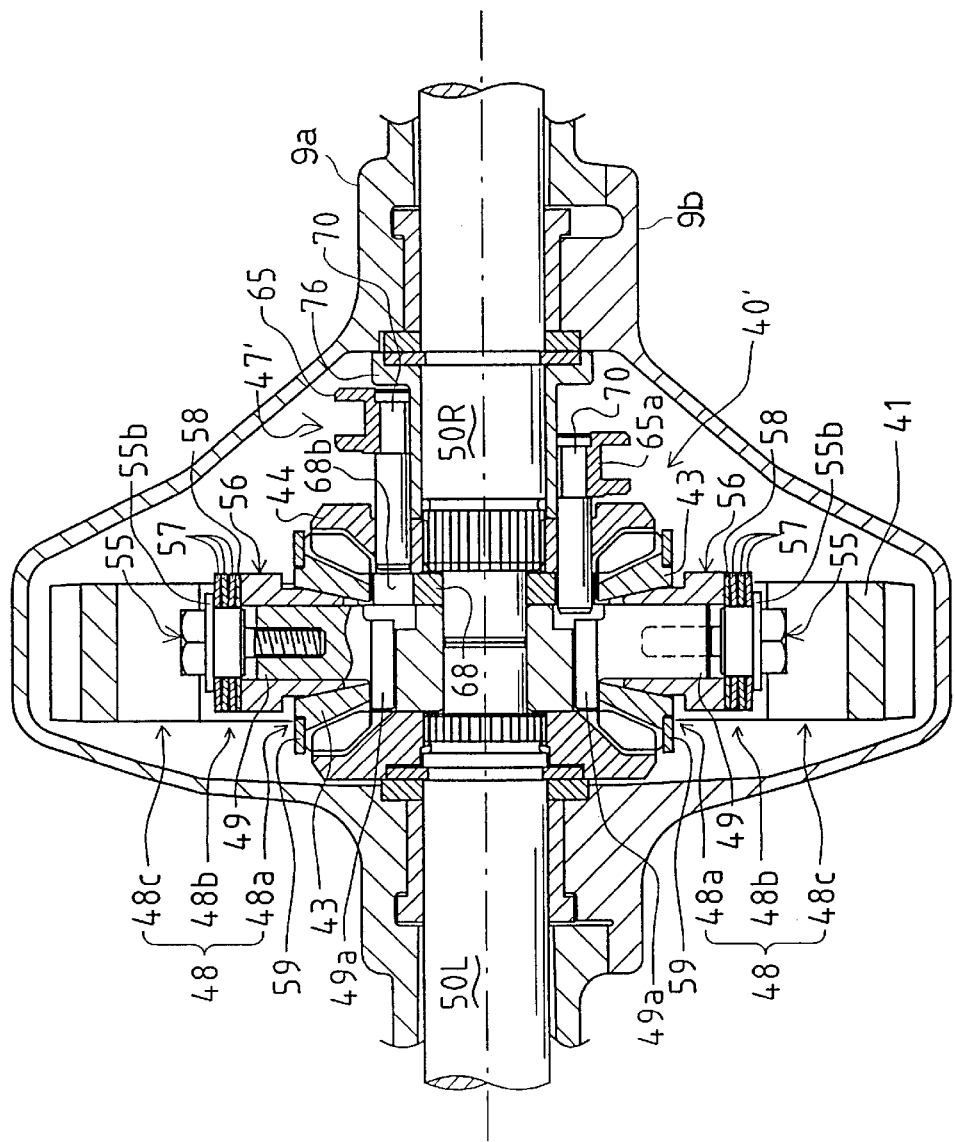
FIG. 5 is a front view, partly in section, of a modified differential gear of the present invention.
Figure 6:
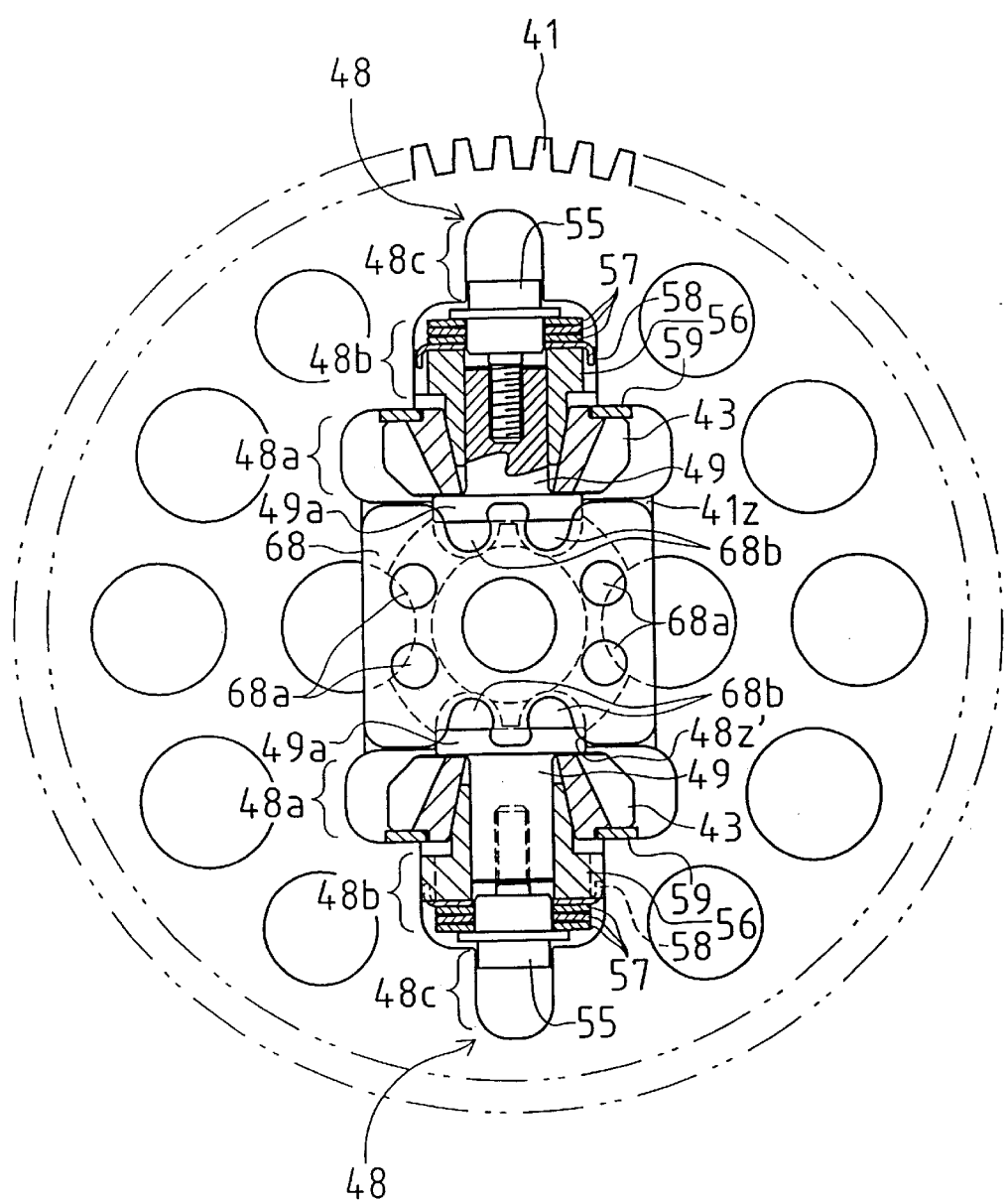
FIG. 6 is a side view of the same.
Figure 7:
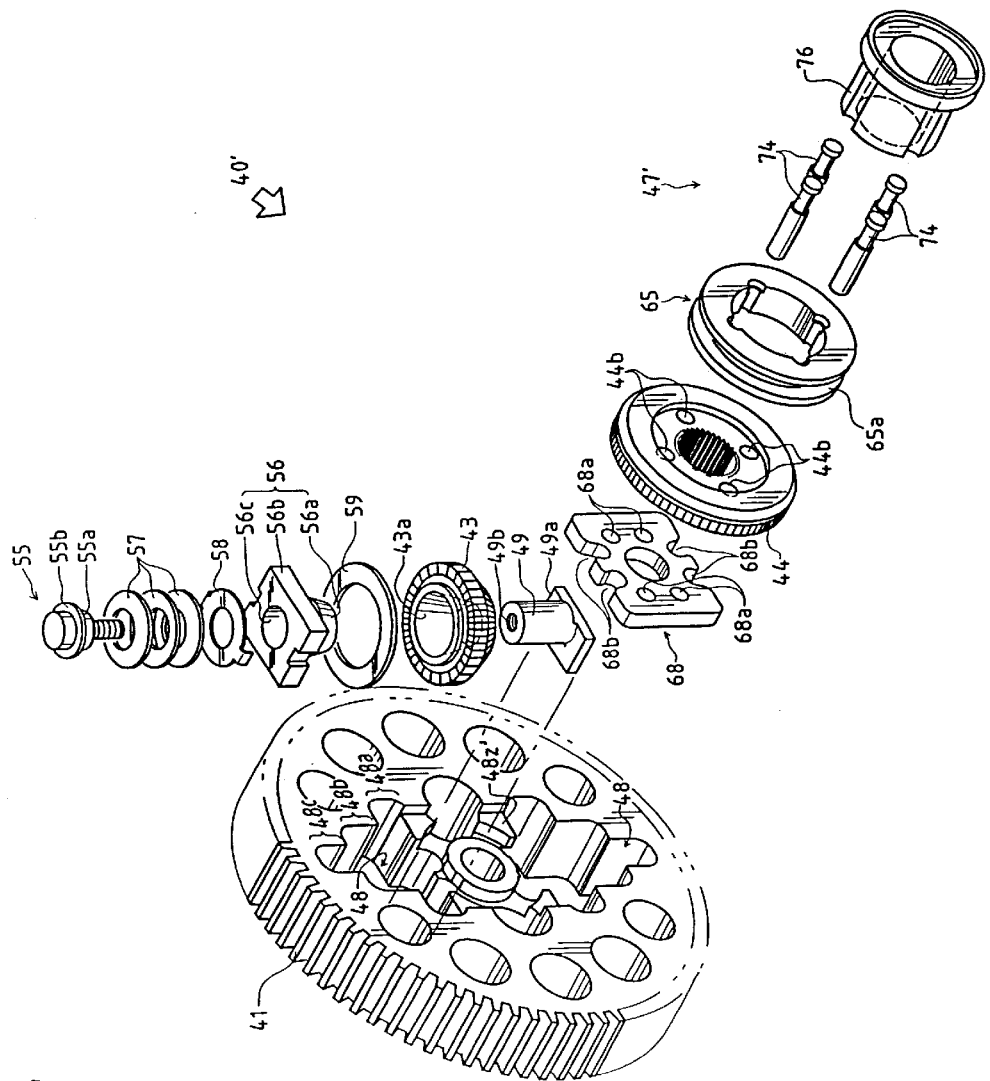
FIG. 7 is an exploded perspective view of the same during assembly thereof.

Alternatively, differential 40 may be modified as shown in FIGS. 5 to 7. Description will be given on a differential 40' as modified differential 40.

Similarly with input gear 41 of the before-discussed embodiment shown in FIGS. 2 to 4, an input gear 41 of this embodiment is also provided with a pair of pinion holes 48 which is stepped with a first chamber 48a, a second chamber 48b and a third chamber 48c so as to become centrifugally narrower with respect to the axis of input gear 41. First chamber 48a, which is the nearest to the axis of input gear 41, accommodates bevel pinion 43. Third chamber 48c, which is the nearest to the outer periphery of input gear 41, accommodates a head of brake force adjusting bolt 55. Second chamber 48b arranged between first and second chambers 48a and 48c accommodates leaf springs 57.

Thus, similarly with the embodiment shown in FIGS. 2 to 4, a pair of common assemblies, each of which includes bevel pinion 43 and brake member 56 for providing limited-slip differential 40', are attached into respective pinion holes 48 of input gear 41. The assemblies are common with those shown in FIGS. 2 to 4. For convenience in drawing, FIG. 7 illustrates one of the assemblies.

Differential 40' is provided with a differential locking mechanism as follows:

A slide collar 65 is disposed around one of axles 50L and 50R (in this embodiment, right axle 50R) through a bush 76. Four pins 70 are fixedly arranged at regular intervals between slide collar 65 and bush 76 so as to be disposed in parallel to and around axle 50R, thereby constituting a lock member 47'. Slide collar 65 is provided on its outer periphery with a peripheral groove 65a. A shifter fork (not shown) which is identical with fork 73b shown in FIGS. 2 and 3 is engaged into groove 65a.

As shown in FIG. 7, one of side bevel gears 44, which is arranged on the side of lock member 47', is provided with a plurality of holes 44b. Pins 70 are inserted into respective holes 44b.

For a different point from input gear 41 shown in FIGS. 2 to 4, input gear 41 shown in FIGS. 5 to 7 has a rectangular recess 48z' facing lock member 47'. Correspondingly, a rectangular engage plate 68 is nonrelatively rotatably engaged into recess 48z'. Engage plate 68 is provided with holes 68a and notches 68b in correspondence to pins 70.

For convenience in drawing, FIG. 5 illustrates an upper part of slide collar 65 above axle 50R as being at its unlocking position, and a lower part thereof below axle 50R as being at its locking position. When slide collar 65 is slidden for differential-locking, lock member 47' slides along axle 50R as the lower part thereof below axle 50R shown in FIG. 5, thereby making pins 70 project from holes 44b of right side bevel gear 44 into respective holes 68a and notches 68b of engage plate 68. Consequently, right side bevel gear 44 and input gear 41 are non-relatively rotatably connected with each other so that left and right axles 50L and 50R are rotated integrally with each other.

In both the embodiments shown in FIGS. 2 to 4, and in FIGS. 5 to 7, if possible, one of the pair of assemblies including respective bevel pinions 43 and brake members 56 may be removed.

Furthermore, in both the embodiments shown in FIGS. 2 to 4, and in FIGS. 5 to 7, bevel pinion 43 abut in a frictional manner against the surface of brake member 56 fixed to pinion shaft 49. Alternatively, the inner-peripheral surface of a bevel pinion may directly abut in a frictional manner against a pinion shaft without such a brake member 56 while an adjustable spring force is applied to adjust the connection of the bevel pinion and the pinion shaft, as disclosed in the cited U.S. Pat. No. 5,897,452, for example. Any structure may be all right if a certain frictional braking force is generated between the bevel pinion and the pinion shaft, that is, the side bevel gears receive a certain frictional braking force via the bevel pinion.

Moreover, it can be said all right if such a frictional braking force is finally applied on the side bevel gears. Thus, a frictional portion for braking is not peculiar to a bevel pinion, but may be provided on an input gear of a differential, or, if being provided with a differential casing, such a frictional braking mechanism may be constructed between the differential casing and a side bevel gear.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A differential gear for differentially connecting a pair of axles, comprising:
   a pair of side bevel gears fixed onto said respective axles;
   a bevel pinion engaging with both said side bevel gears, wherein a certain friction force is applied onto said side bevel gears through said bevel pinion;
   an input gear having a through hole, wherein said bevel pinion is disposed in said through hole, and
   a lock member selectively bringing one of said side bevel gears into non-relatively rotatable connection with said input gear.

2. A differential gear for differentially connecting a pair of axles, comprising:
   a pair of side bevel gears fixed onto said respective axles;
   a bevel pinion engaging with both said side bevel gears;
   a pinion shaft rotatably supporting said bevel pinion therearound while said pinion shaft being applying a certain brake force onto said bevel pinion;
   an input gear having a through hole, wherein said pinion shaft is disposed in said through hole, and
   a lock member selectively bringing one of said side bevel gears into relatively-rotatable connection with said input gear.

3. A transaxle apparatus having a differential gear for differentially connecting a pair of axles, comprising:
   a housing rotatably supporting said pair of axles and containing said differential gear, said differential gear including,
   a pair of side bevel gears fixed onto said respective axles,
   a bevel pinion engaging with both said side bevel gears, wherein a certain friction force is applied onto said side bevel gears through said bevel pinion,
   an input gear having a through hole in which said bevel pinion is disposed, and
   a lock member selectively bringing one of said side bevel gears into relatively-rotatable connection with said input gear.

4. A transaxle apparatus having a differential gear for differentially connecting a pair of axles, comprising:
   a hydrostatic transmission; and
   a housing rotatably supporting said pair of axles and containing said hydrostatic transmission and said differential gear, said differential gear including,
   a pair of side bevel gears fixed onto said respective axles,
   a bevel pinion engaging with both said side bevel gears, wherein a certain friction force is applied onto said side bevel gears through said bevel pinion,
   an input gear receiving the output of said hydrostatic transmission, said input gear having a through hole in which said bevel pinion is disposed, and
   a lock member selectively bringing one of said side bevel gears into relatively-rotatable connection with said input gear.

5. A transaxle apparatus having a differential gear for differentially connecting a pair of axles, comprising:
   a hydrostatic transmission; and
   a housing rotatably supporting said pair of axles and containing said hydrostatic transmission and said differential gear, said differential gear including,
   a pair of side bevel gears fixed onto said respective axles;
   a bevel pinion engaging with both said side gears, wherein a certain friction force is applied onto said side bevel gears;
   an input gear receiving the output of said hydrostatic transmission; and
   a lock member selectively bringing one of said side bevel gears into relatively-rotatable connection with said input gear.

* * * * *